Jan. 8, 1952 W. L. CARLSON 2,582,005
STATOR AND METHOD OF MAKING SAME
Filed Oct. 27, 1948 2 SHEETS—SHEET 1

INVENTOR
WILBUR L. CARLSON
BY
*Spencer, Hardman & Fehr*
HIS ATTORNEYS

Jan. 8, 1952 W. L. CARLSON 2,582,005
STATOR AND METHOD OF MAKING SAME
Filed Oct. 27, 1948 2 SHEETS—SHEET 2

INVENTOR
WILBUR L. CARLSON
BY
*Spencer, Hardman & Fahr*
HIS ATTORNEYS

Patented Jan. 8, 1952

2,582,005

UNITED STATES PATENT OFFICE 2,582,005

STATOR AND METHOD OF MAKING SAME

Wilbur L. Carlson, Rochester, N. Y., assignor to General Motors Corporation, Detroit, Mich., a corporation of Delaware Application October 27, 1948, Serial No. 56,896

4 Claims. (Cl. 171—252)

This invention relates to improvements in dynamoelectric machines, and more particularly to an improved construction for the stationary member of a dynamoelectric machine and a method of making the same.

The stators of some types of dynamoelectric machines are very costly in their construction in that they require a number of machining and assembly operations before they may be properly mounted in the electric machine. In laminated stators especially, the laminations which are held together by bolts, rivets or the like, the laminations must be punched with holes so that the rivets or bolts can be forced therethrough. The punching of the rivet holes materially increases the cost of manufacture of the stator in that punching dies must be provided to pierce the holes in the laminations, the rivets or bolts must be forced through the holes, and finally the rivets must be peened over or deformed which is rather costly. Further when the laminations are riveted together there is tendency for the laminations to open up or spread apart outside the immediate vicinity of the rivets. This condition is especially aggravated if the rivets are set too tight and this condition is difficult to control as the width of the stack of laminations will vary some due to the "pile up" variation of the laminations. In addition to making an expensive structure, the rivets which must pass through the laminations "link" some of the magnetic flux and thus cause considerable energy losses in the motor.

In order to reduce the cost of manufacturing laminated stators, the present invention provides a dynamo electric machine in which the stator eliminates the use of rivets or bolts and at the same time the liability of short circuiting which rivets may cause as there are no fastening devices within the magnetic circuit.

Among the objects of the present invention are the provisions of an improved laminated stator and method of construction which includes uniting the outer edges of the laminations with a plurality of bars or plates by projection welding transversely across the peripheral edges of the laminations at spaced intervals and have ends projecting beyond opposite ends of the stator which overlie the end laminations to hold the laminations forming the stator together.

Another object of the invention is to provide fastening or securing devices of a character which will permit machining of the securing device to provide surfaces to receive end frames which will close a shell or cylinder housing a stator core to form a stator unit having spaces adjacent the shell and between the plates which serve as ducts through which cooling air may be circulated.

Further objects and advantages of the present invention will be apparent from the following description, reference being had to the accompanying drawings wherein a preferred embodiment of the present invention is clearly shown.

Figure 6:
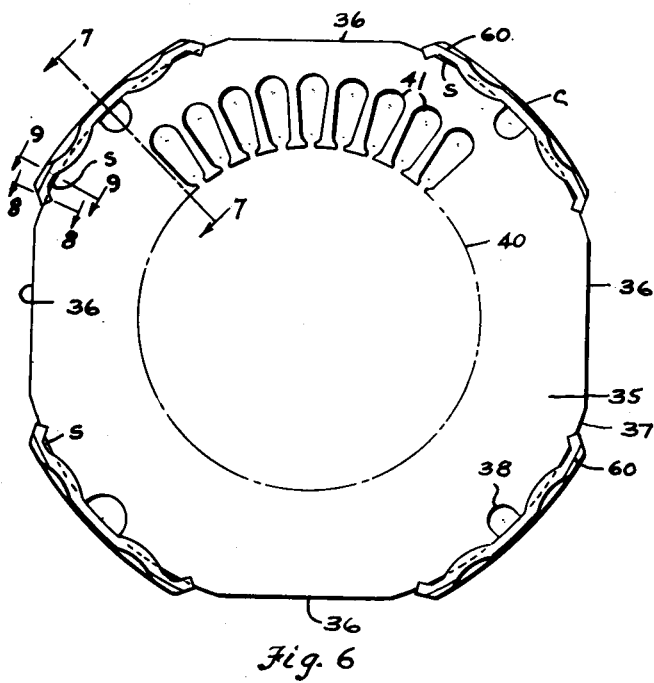
Fig. 6 is an end view of the stator with the plates attached.
Figure 7:
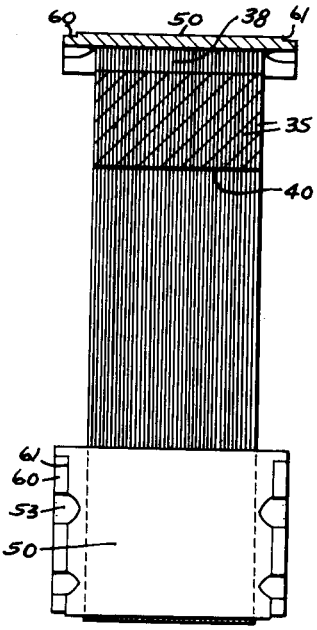
Fig. 7 is a broken sectional side view of the stator shown in Fig. 6, the section being taken on line 7—7 of Fig. 6.
Figure 8:
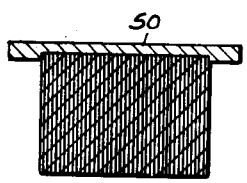
Figure 9:
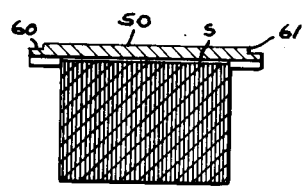

Figs. 8 and 9 are sectional views taken on lines 8—8 and 9—9 respectively of Fig. 6.

In the drawings I have shown my invention in connection with a dynamo electric machine 20 including end members or frames 21 and 22 carrying bearings 23 and 24, respectively, for a shaft 25 to which is fixed a rotor or armature 26. The armature 26 comprises a plurality of laminations in abutting relation, said laminations having aligned ventilating apertures 28 and conductor receiving openings 29 filled with cast conductors 30. These conductors are united by spaced cast end rings 31 and 32 with fan blades 33 formed integral with end ring 31 so that air drawn through openings in one of the end members is circulated through the interior of the motor for the purpose of cooling the operating parts.

The stator for the dynamo-electric machine in accordance with this invention comprises a plurality of preformed laminations, 35, see Fig. 6. In this instance the laminations are provided with straight parallel sides 36 with the corners rounded off at 37 upon an arc concentric with the axis of the lamination. These rounded portions 37 of the laminations have notches 38 to receive a bolt 39. If desired the notches 38 could be eliminated from the laminations. In that case suitable formed bolts will pass over the outside of the laminations. In this way, full use will be made of the laminations for conducting magnetic flux. The central portion of the laminations are provided a central opening 40 for the armature 26 and a plurality of radial slots 41 for reception of stator windings 42. The plurality of laminations which form the stator are secured together in abutting relation by metal plates or bars 50.

The plates or bars 50 which secure the laminations together are punched from sheet metal and are curved preferably transversely on an arc whose radius is greater than the rounded portions 37 of the laminations. The opposite side edges of the plates are bent inwardly as at 51 to form a channel and provide parallel sharp edges 52 which are adapted to contact the periphery of the laminations on opposite sides of the notches 38. The ends of the plate are indented inwardly as at 53 to form internal shoulders 54 on the inner surface of the plate. The distance between the shoulders formed by the indentations 53 equals the width of the assembly of the laminations to which the plates are to be applied.

In fabricating the stator the required number of laminations 35 are first assembled on a mandrel with their notches 38 in alignment and then the laminations are clamped tightly by suitable means, such as a press, so that a compact stack of laminations is formed, and while in this condition, the required number of channeled plates 50 are postioned a definite distance apart about the periphery of the stator so that the sharp edges 52 of the plates contact the periphery of the laminations and disposed on opposite sides of the notches 38. When the plates are so positioned they are fixed to the lamination by projection welding.

The welding circuit, not shown, suitable for welding the plates 50 to the laminations includes a welding transformer having a primary coil and a secondary coil whose leads are connected with welding electrodes. The electrodes are operable so that they will be forced against the plates 50 to move the sharp edges thereon in contact with periphery of the laminations. While pressure is thus applied, the welding current is turned on and the plates are united with the laminations by projection welding by virtue of the sharp corners 52 which engage the laminations melt. The melted metal flows into the spaces S, see Fig. 6, as the electrodes force the plates toward the stator. When the central portion C of the plates 50 makes good contact with the lamination the welding current is turned off. Due to the fusion of the sharp edges which engage the laminations in the welding operation opposite the end portions of the plates overlie the outermost laminations, thus the plates straddle the stator core as clearly shown in Fig. 8 to hold the laminations together. The variations in the width of the stator core will not effect straddling as it will be self adjusting. These extreme ends, which straddle the laminations, become heated during the welding operation and consequently, after the welding has been made the cooling down of the plates will cause contraction of the metal and cause the ends to draw the laminations firmly one against the other and with greater strength than when the bunch is held together by rivets or bolts.

As stated heretofore the opposite ends of the channeled plates 50 extend beyond the opposite ends of the stator core. In order to concentrically support the end members or frames 21 and 22 and thus support the rotor or armature 25 in the center of the field, the ends of the plates are machined to form arcuate surfaces 60 on the plates which are concentric with the axis of the stator laminations. The machining of the plates will produce shoulders 61 which are at right angles to surfaces 60.

The surfaces 60 receive the inner surface of a flange 69 provided by the end members and the ends of the flanges are held against the shoulders 61 by through bolts 39 passing through the aligned notches 38 in the laminations forming the stator core.

In order to provide for two paths of air travel through the operating parts of the dynamoelectric machine the end member 21 is provided with a series of inlet openings 65. A baffle plate 66 may be welded to or detachably secured in any suitable manner, not shown, to the inner side of the frame 21. The baffle plate or member 66 comprises an annular dish shaped configuration providing a curved or conical body portion 67 having a central opening 68 defined by the inner end of the body. The baffle 66 cooperates with the blades 33 formed integral with the cast conductors 28. It is pointed out that instead of forming blades 33 on the cast end rings 31 a fan made from sheet metal could be used in which case the hub of the fan would be forced on the knurled portion of the shaft and positioned to the left of the armature as viewed in Fig. 1. The fan blades 33 provide two different paths of air as it is drawn through the opening 68. The blades 33 will direct one portion of the air through the passages 28 and another portion of air over the periphery of the stator through air ducts 71 formed between the space plates 50 and the band or shell 72. The outlet for these paths of air is through openings 73 provided in the end member 22. The ducts 71 are formed by providing the flanges of the end members 21 and 22 with grooves 74 which receive the edges of the band so that the motor may be converted into the enclosed type.

Figure 1:
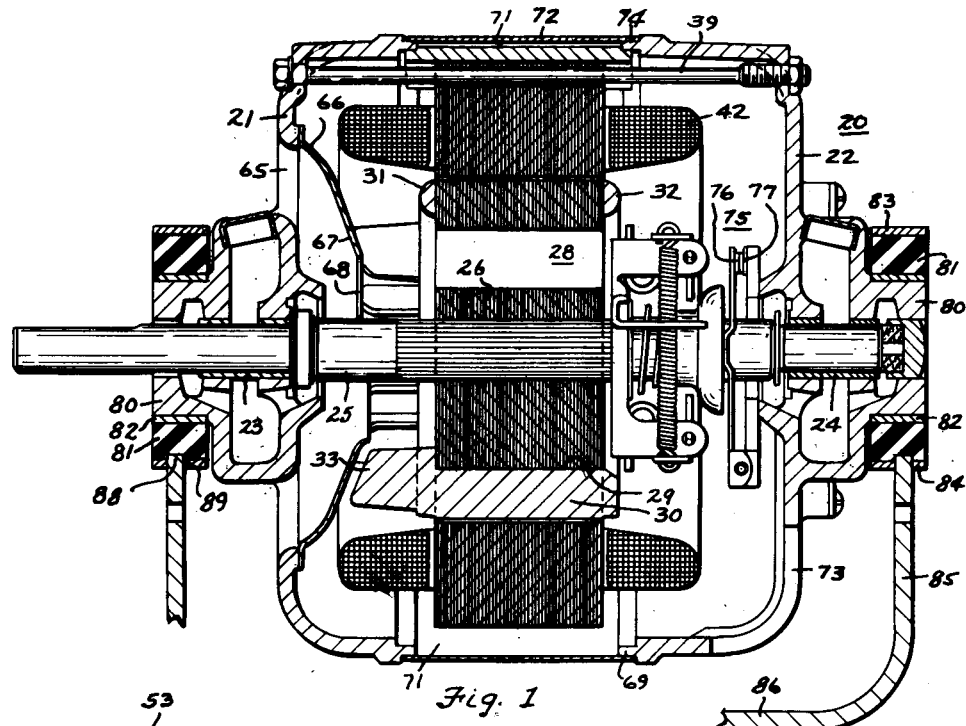
Fig. 1 is a sectional view through a motor embodying the invention.
Figure 2:
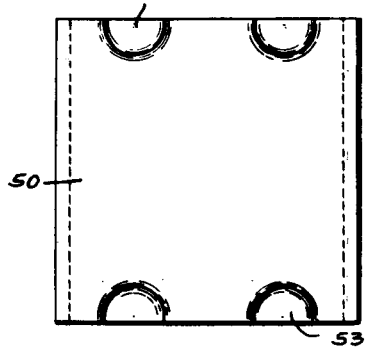
Fig. 2 is a plan view of one of the plates used in the stator.
Figure 5:
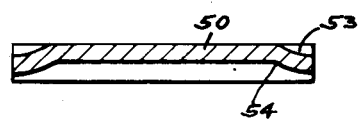
Fig. 5 is a sectional view taken on the line 5—5 of Fig. 2.
Figure 3:
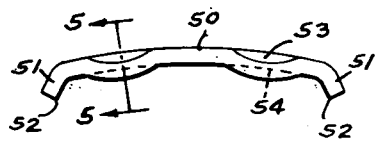
Fig. 3 is an end view of the plate.
Figure 4:
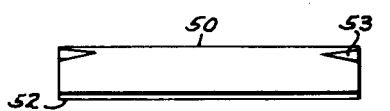
Fig. 4 is a side view of the plate.

On the right side of the armature, as viewed in Fig. 1, a centrifugal switch 75 is provided. The shaft 25 carries the rotating elements of the centrifugal switch or cutout while the end member 22 carries the stationary element which includes a movable contact 76 and a fixed contact 77. Since the centrifugal switch does not form any part of the present invention any well known construction which operates in the well known manner to cut out the starting coils of the armature after the armature has attained a predetermined speed may be used, thus a detailed description of the centrifugal switch is here dispensed with.

The dynamo electric machine is supported on a cushioning mounting. In this instance the end members 21 and 22 are formed with bosses 80 surrounded by an annulus of resilient material 81 having a metal band 82 bonded to the inner surface thereof. A pair of stiff metal straps, an upper strap 83 and a lower strap 84 embrace the band 82. The machine is supported by a U-shaped base having vertical arms 85 and a yoke 86. Each arm 85 is provided with a recess provided with a tongue 88 extending upwardly from the bottom thereof. When the lower strap 82 is fitted in the recess the tongue 88 will register with an opening 89 in the lower strap to prevent the straps from turning relative to the arm. The straps are detachably secured to the arms by securing means, not shown.

While the embodiment of the present invention as herein disclosed, constitutes a preferred form, it is to be understood that other forms might be adopted.

What is claimed is as follows:

1. The method of making a stator for an A. C.

motor which comprises assembling a stack of metal laminae each of which is an internally slotted ring and, while maintaining the stack temporarily in assembly with the laminae in alignment, forcing against the outer periphery of the laminae stack a plurality of metal binding members each made made of metal of substantially the same thermal coefficient of expansion as the metal of the laminae, each having thickness substantially less than the width of a lamina ring from slot inner end to outer periphery, each having length greater than the width of the stack, and each having a relatively narrow rib the intermediate portion of which initially engages the stack periphery and the end portions of which extend respectively beyond the end laminae and, while the ribs are pressed against the stack, passing electric current between the stack and ribs to cause fusion of the ribs and the engaged portions of the stack so that the ribs are mashed into the laminae and are united with metal thereof, the welding operation causing the mean temperature of the binding members, by virtue of their relative thinness, to exceed substantially the mean temperature of the stack whereby, upon cooling of the assembly, the binding members have a shrink fit about the laminae stack, the unfused end portions of the ribs serving as lugs which grip the stack.

2. The method of making a stator core comprising the steps which include, stacking a plurality of centrally pierced laminations, clamping the laminations endwise in stacked relation; positioning a plurality of plates equally spaced around the laminations and at the stack outer edge thereof; applying pressure circumferentially in opposed direction to the plates and simultaneously imposing a welding current causing the plates to move toward the center of the stack of laminations and simultaneously weld the plates to the laminations.

3. The method of making a stator core comprising the steps which include, stacking a plurality of centrally pierced laminations, clamping the laminations endwise in stacked relation; positioning a plurality of channel plates having longitudinal sharp edges around the laminations substantially 90° apart so that the sharp edges will contact the outer edges of the laminations; applying opposed pressure at 180° apart to the plates and simultaneously imposing a welding current causing the sharp corners to fuse as the plates move toward the center of the stack of laminations and simultaneously weld the plates to the laminations.

4. A stator for an A. C. motor comprising a stack of metal laminae, each lamina being an internally slotted ring, a plurality of metal binding members located adjacent the outer periphery of the laminae and retaining the stack in assembled relation, each member being formed of metal of substantially the same thermal coefficient of expansion as the metal of the laminae, each having thickness substantially less than the width of a lamina ring from slot inner end to outer periphery, each having length exceeding the length of the stack of laminae, each member providing a rib, the major, intermediate portion of which is mashed into the peripheral portion of the stack by an electrical projection welding operation which unites said portion with the metal of the laminae, the end portions of the rib extending beyond and being in contact with the end laminae, the member having a shrink fit about the laminae resulting, after the welding operation, from lengthwise contraction of the member in excess of lengthwise contraction of the stack because the welding operation, by virtue of the thinness of the member, had caused the mean temperature of the member substantially to exceed the mean temperature of the stack.

WILBUR L. CARLSON.

REFERENCES CITED

The following references are of record in the file of this patent:

UNITED STATES PATENTS

| Number | Name | Date |
| --- | --- | --- |
| 1,040,418 | Rietzel | Oct. 8, 1912 |
| 1,654,306 | Paszkowski | Dec. 27, 1927 |
| 1,661,135 | Knight | Feb. 28, 1928 |
| 1,706,703 | Murray | Mar. 26, 1929 |
| 1,820,531 | Engelhardt | Aug. 25, 1931 |
| 1,852,829 | Welch | Apr. 5, 1932 |
| 1,976,541 | Brown | Oct. 9, 1934 |
| 2,285,609 | Pedersen | June 9, 1942 |
| 2,338,467 | Tench | Jan. 4, 1944 |
| 2,424,443 | Evans | July 22, 1947 |
| 2,478,316 | Potter | Aug. 9, 1949 |
| 2,496,507 | Watkins | Feb. 7, 1950 |